United States Patent
Shrader et al.

(10) Patent No.: US 11,479,479 B2
(45) Date of Patent: *Oct. 25, 2022

(54) WASTEWATER PROCESSING

(71) Applicant: M2 Water Solutions LLC, Indianapolis, IN (US)

(72) Inventors: Martin Shrader, Indianapolis, IN (US); Merrill Reece, Jr., Indianapolis, IN (US); Anthony Haag, Brownsburg, IN (US); Paul Kite, Indianapolis, IN (US)

(73) Assignee: M2 Water Solutions, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,511

(22) Filed: Nov. 9, 2020

(65) Prior Publication Data

US 2021/0053843 A1 Feb. 25, 2021

Related U.S. Application Data

(60) Continuation-in-part of application No. 17/069,005, filed on Oct. 13, 2020, which is a division of application No. 16/192,083, filed on Nov. 15, 2018, now Pat. No. 10,807,884.

(60) Provisional application No. 62/933,414, filed on Nov. 9, 2019, provisional application No. 62/933,416, filed on Nov. 9, 2019.

(51) Int. Cl.
*C02F 1/04* (2006.01)
*B01D 1/16* (2006.01)
*B01D 1/00* (2006.01)

(52) U.S. Cl.
CPC ............ *C02F 1/048* (2013.01); *B01D 1/0058* (2013.01); *B01D 1/0082* (2013.01); *B01D 1/16* (2013.01)

(58) Field of Classification Search
CPC ..... C02F 1/048; B01D 1/0058; B01D 1/0082; B01D 1/16
See application file for complete search history.

(56) References Cited

U.S. PATENT DOCUMENTS 3,843,463 A 10/1974 Brown
3,970,511 A 7/1976 Rat et al.
(Continued)

OTHER PUBLICATIONS

Webpage for Colaris Thermal Process Technology. https://caloris.com/caloris-agilix-mobile-evaporator/ Accessed Feb. 18, 2019, online.
(Continued)

*Primary Examiner* — Jonathan Miller
(74) *Attorney, Agent, or Firm* — Indiano Law Group LLC; E. Victor Indiano; John T. Woods, III

(57) ABSTRACT

A wastewater collection tank feeds a vaporizing unit through an inlet near the unit's top. A burner produces hot air, which a blower blows through a blower tube that passes through the upper portion of the unit to the bottom portion of the unit. A substrate through which air can pass extends across the unit between the bottom of the blower tube and the wastewater inlet. The hot air moving upward through the unit heats the falling wastewater, a substantial portion of which is vaporized therefrom. The vapor is vented from the top of the unit. Un-vaporized wastewater collects at the bottom of the unit and is recycled through the system with raw wastewater in the collection tank.

20 Claims, 16 Drawing Sheets

(56) References Cited

U.S. PATENT DOCUMENTS

| | | |
|---|---|---|
| 4,045,314 A | 8/1977 | Rod et al. |
| 4,354,899 A | 10/1982 | Broberg et al. |
| 5,183,577 A | 2/1993 | Lehmann |
| 5,207,869 A | 5/1993 | Harmoning et al. |
| 5,256,251 A | 10/1993 | Holcombe |
| 5,259,931 A | 11/1993 | Fox |
| 6,623,645 B1 | 9/2003 | Roach et al. |
| 6,887,344 B1 | 5/2005 | VanKouwenberg |
| 6,913,671 B2 | 7/2005 | Bolton et al. |
| 7,228,682 B2 | 6/2007 | Kashler |
| 7,448,600 B1 | 11/2008 | Boulter |
| 7,604,710 B2 | 10/2009 | Haslem et al. |
| 7,681,643 B2 | 3/2010 | Heins |
| 7,722,739 B2 | 5/2010 | Haslem et al. |
| 8,211,303 B2 | 7/2012 | Page et al. |
| 8,216,468 B2 | 7/2012 | Page et al. |
| 8,256,748 B1 | 9/2012 | Boulter |
| 8,282,772 B2 | 10/2012 | Jepson |
| 8,343,310 B2 | 1/2013 | Fielding et al. |
| 8,425,668 B2 | 4/2013 | Lakatos et al. |
| 8,470,139 B2 | 6/2013 | Booth |
| 8,679,291 B2 | 3/2014 | Duesel, Jr. et al. |
| 8,764,947 B2 | 7/2014 | Tang et al. |
| 8,877,690 B2 | 11/2014 | Keister |
| 8,906,203 B2 | 12/2014 | Ugolin |
| 9,446,974 B2 | 9/2016 | Milner et al. |
| 9,580,343 B2 | 2/2017 | Keister |
| 9,770,671 B2 * | 9/2017 | Curlett .................. E02B 15/042 |
| 10,092,851 B2 | 10/2018 | Dighe |
| 10,807,884 B2 * | 10/2020 | Shrader ................ B01D 1/0058 |
| 2011/0140457 A1 | 6/2011 | Lakatos et al. |
| 2012/0247942 A1 | 10/2012 | Curlett et al. |
| 2016/0045841 A1 | 2/2016 | Kaplan et al. |
| 2017/0282094 A1 | 10/2017 | Wan et al. |

OTHER PUBLICATIONS

U.S. Appl. No. 17/069,005, entitled "Wastewater Processing at Atmospheric Pressure," filed Oct. 13, 2020.

* cited by examiner

WASTEWATER PROCESSING

CROSS-REFERENCE TO RELATED APPLICATIONS

This application is a continuation-in-part of U.S. application Ser. No. 17/069,005, filed Oct. 13, 2020, entitled "Wastewater Processing at Atmospheric Pressure," which is a divisional of U.S. Pat. No. 10,807,884, issued Oct. 20, 2020, entitled "Wastewater Processing at Atmospheric Pressure," and this application also claims the benefit of U.S. Provisional Application No. 62/933,416, filed Nov. 9, 2019, entitled "Quick Change Nozzle System for Water Processing System and Method for Quickly Changing and Maintaining Nozzles in a Process Spray System," and claims the benefit of U.S. Provisional Application No. 62/933,414, filed Nov. 9, 2019, entitled "Remotely Monitored and Controlled Wastewater Processing at Atmospheric Pressure and Method for Remotely Monitoring and Controlling a Wastewater Processing System," the entireties of which are herein incorporated by reference.

BACKGROUND

Water is often used for or generated by various tasks in the oil and gas industry. For example, water may be injected into a well to re-pressurize a reservoir, water may be pumped from a well in the process of extracting oil or gas, and water may be used to deliver proppants to underground fractures. As a result, a great deal of wastewater is generated. Significant operational costs are incurred by oil and gas owners and operators related to the disposal or re-use of such wastewater. Many other high-volume, remote location wastewater generators have similar significant operational costs for disposal of wastewater.

Dealing with wastewater often involves one or more unit operations, such as distillation, filtration, and vaporization. Distillation is an energy-intensive process that frequently requires large distillation columns. Filtration may require frequent filter changes to keep the system operating at the desired contaminant levels. Vaporization may require pre-conditioning and/or high-pressure operation. As a result, a wastewater producer must have personnel on hand to operate wastewater processing units and must have the required energy and materials available to process the produced wastewater. Many wastewater processing units are large, fixed installations not suitable for mid-volume remote locations. If a producer does not deal with the wastewater where it is produced, they must ship it, often long distances from remote locations, for processing and/or disposal. Such shipping and disposal costs can add significantly to operational costs. Thus, processing and/or disposal of wastewater from oil and gas and other remote operations may be particularly costly and/or cumbersome.

While a variety of wastewater processing systems and methods have been made and used, it is believed that no one prior to the inventor(s) has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
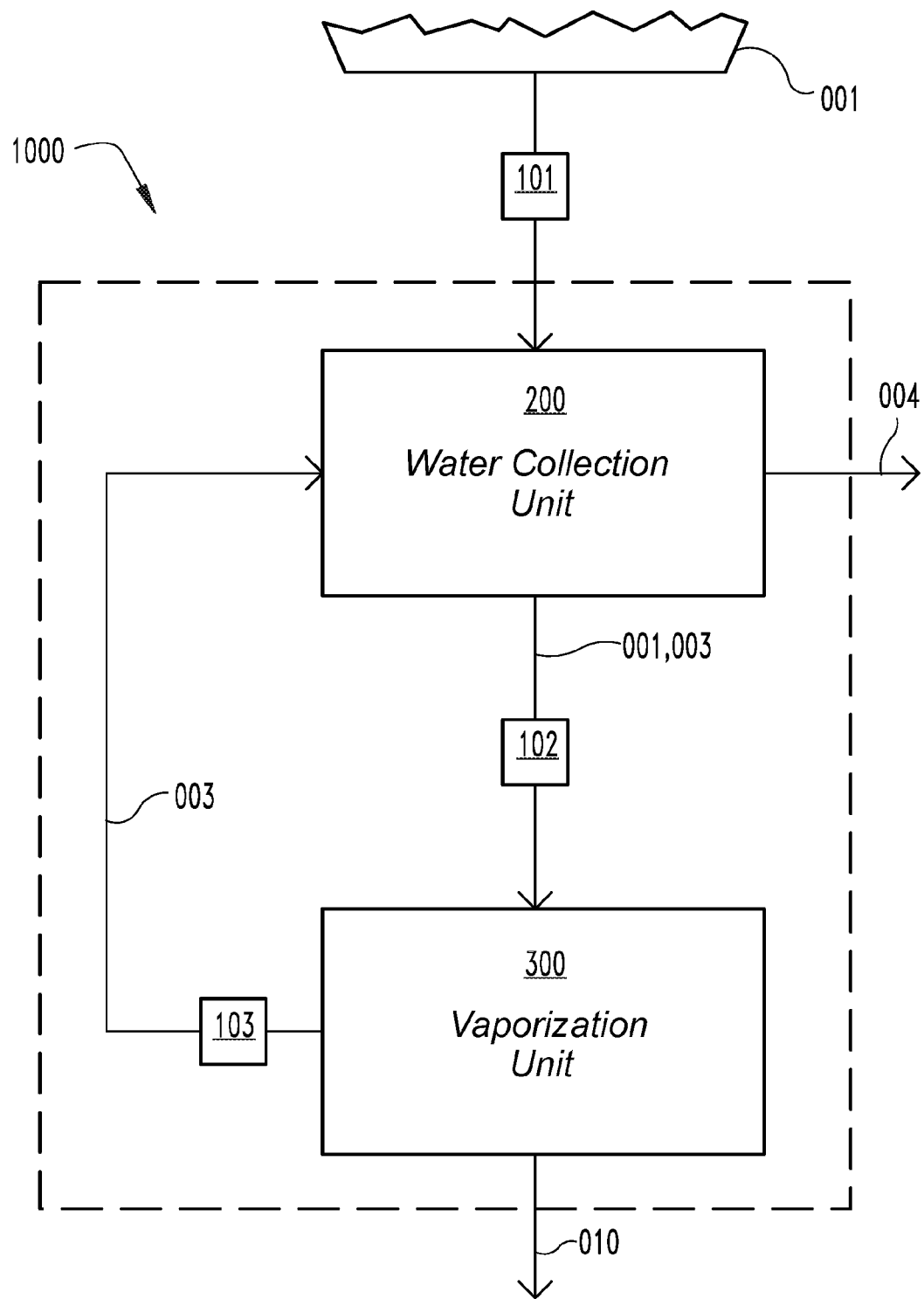
FIG. 1 is a schematic block diagram of an exemplary wastewater processing system.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is, by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Wastewater processing systems according to the present disclosure may be utilized to process wastewater from oil and/or gas operations as well as other high volume, remote location wastewater generators, including without limitation, landfill leachate and livestock wastewater. "Unprocessed wastewater," or "raw wastewater," in some embodiments of the invention is water that has been generated in the production of oil or gas.

Exemplary wastewater processing apparatuses may comprise a chamber, a burner, a blower, a wastewater introduction port, and a vent. The chamber may have an upper portion, a lower portion, and an outer wall. The burner may be configured to output hot air. The blower may be configured to deliver the hot air to the lower portion of the chamber at substantially atmospheric pressure. The hot air is hot enough to vaporize at least a portion of the introduced wastewater.

Exemplary wastewater processing methods may comprise the following steps. Wastewater is introduced through a wastewater introduction port into an upper region of a chamber. Hot air is introduced into a lower region of the chamber at substantially atmospheric pressure, where the hot air is hot enough to vaporize a substantial portion of the wastewater as it moves downward through the chamber. The vaporized portion of the wastewater is vented.

Exemplary wastewater processing methods may comprise the following steps. A first batch of wastewater is collected. The first batch of wastewater is vaporized by exposing the first portion to heated air at approximately atmospheric pressure to form a first vapor. A mix of both un-vaporized water from the first portion and additional wastewater from the first batch is collected and recycled to create a second portion of the first batch of wastewater. At least part of the second portion of the first batch of wastewater is vaporized by exposing the second portion to heated air at approximately atmospheric pressure to create a second vapor.

FIG. 1 is a schematic block diagram generally illustrating exemplary wastewater processing system (1000) in accordance with the present disclosure. Wastewater processing system (1000) comprises water collection unit (200) in fluid communication with vaporization unit (300).

A batch of raw wastewater (001) is transferred into water collection unit (200) via feed pump (101). Raw wastewater (001) is dispensed from a water collection unit into vaporization unit (300) in a continuous stream via pump (102). Vaporization unit (300) vaporizes a portion of raw wastewater (001) at around atmospheric pressure using hot air to create water vapor (010). Water vapor (010) exits vaporization unit (300) and is released into the atmosphere outside of wastewater processing system (1000).

A portion of the first aliquot of raw wastewater that is not vaporized, i.e., un-vaporized water (003), collects in the vaporization unit (300). There, un-vaporized water (003) continues to be exposed to hot air, redirecting the hot air as discussed below while further heating that un-vaporized water (003) and possibly causing additional evaporation at its surface. In some embodiments, the absorption of heat by un-vaporized water (003) also reduces the temperature of the hull and other components of vaporization unit (300) during operation.

After un-vaporized water (003) reaches a threshold level within vaporization unit (300), it is transferred via pump (103) into water collection unit (200) where it at least partially mixes with the raw wastewater (001) already present therein. The resulting mixed wastewater (001/003) is dispensed in a continuous stream from water collection unit (200) into vaporization unit (300), where it is partially vaporized and released as water vapor (010) into the atmosphere. Un-vaporized portions of mixed wastewater (001/003) collect in vaporization unit (300), remain further exposed to the incident hot air, and are recycled to the water collection unit (200).

Release of vapor (010) and recirculation of mixed wastewater (001/003) between water collection unit (200) and vaporization unit (300) occurs for a given amount of time, until the source of available raw wastewater (001) is depleted, until only a minimum amount of mixed wastewater (001/003) remains, until mixed wastewater (001/003) contains a predetermined, acceptable concentration of total dissolved solids (TDS), total suspended solids (TSS), and/or volatile organic compounds (VOCs), or until one or more other criteria are met (as will occur to those skilled in the art), after which the now "processed" water (004) is released from the water collection unit (200) for disposal. If additional wastewater is to be processed, another batch of raw wastewater may be transferred into wastewater processing system via water collection unit (200) for processing as described above. The further addition of raw wastewater may be repeated as needed until the raw wastewater to be processed is depleted.

Figure 2:
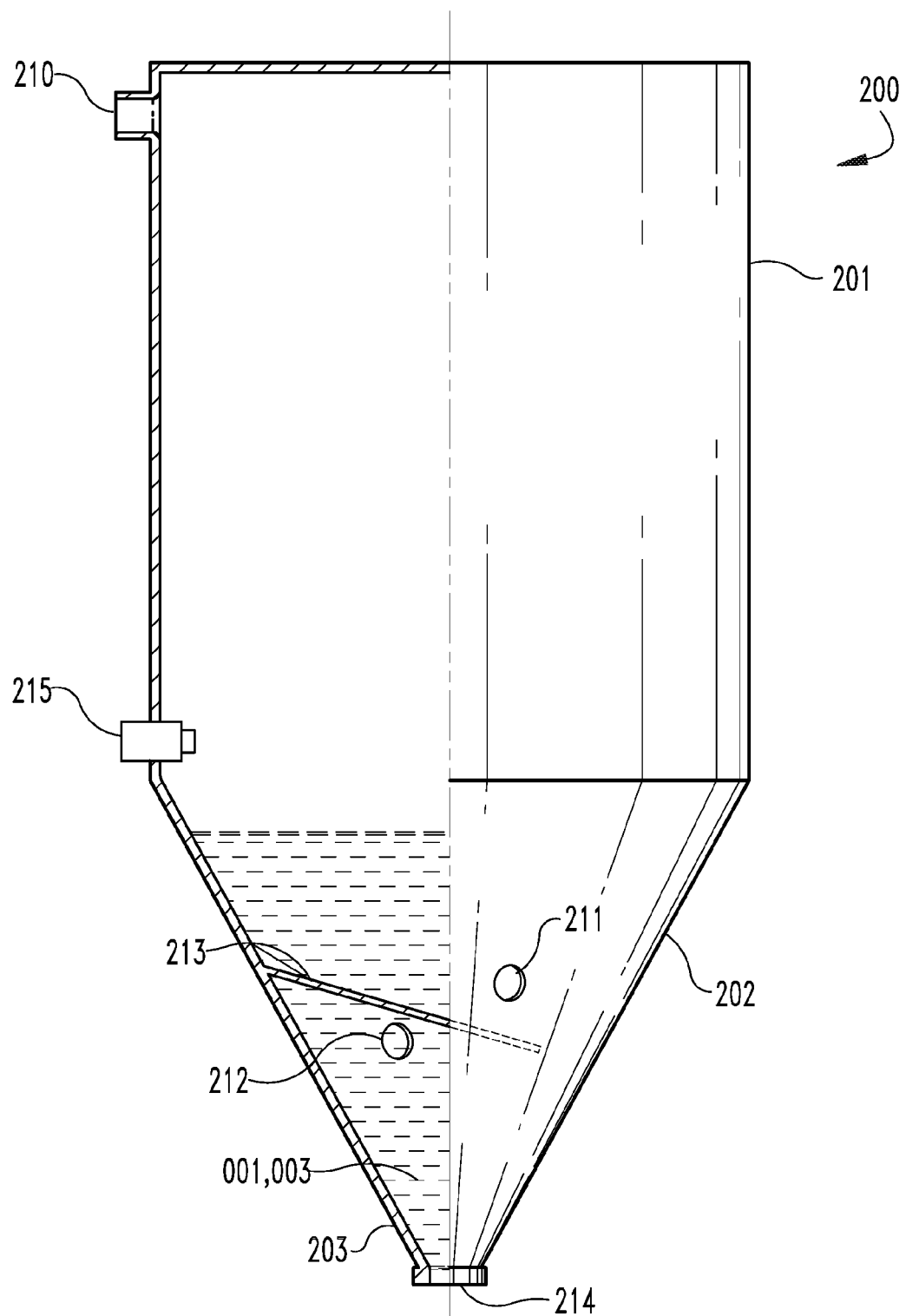
FIG. 2 is a schematic cross-sectional view of an exemplary water collection unit.

FIG. 2 depicts an exemplary water collection unit (200) that is of use in wastewater processing system (1000). In general, water collection unit (200) is configured to: collect raw wastewater (001) to be processed, dispense raw wastewater (001) to vaporization unit (300) in a continuous stream, receive aliquots of un-vaporized water (003) from vaporization unit (300) where it mixes with wastewater (001) or mixed wastewater (001/003) already present in water collection unit (200) and to repeat the wastewater (001/003) collection and recirculation until such time as the resulting processed water (004) has appropriate concentrations for disposal or other criteria have been met as will occur to those skilled in the art.

Exemplary water collection unit (200) comprises raw wastewater inlet (210) proximal to top portion (201) of water collection unit (200). Raw wastewater (001) to be processed may, for example, enter collection unit (200) through raw wastewater inlet (210) directly from a feed tank, from a gas or oil well, industrial processing site, landfill leachate pool, and/or naturally occurring water source.

Aliquots of raw wastewater (001) to be processed are dispensed through raw water inlet (210) into water collection unit (200) using any suitable method, including, but not limited to, via feed pump (101) as shown in FIG. 1. Raw wastewater (001) may be dispensed through raw water inlet (210) into water collection unit (200) at a rate suitable for the materials and equipment, such as a rate between about 6 and about 17 gallons per minute ("gpm").

At least some of raw wastewater (001) that is dispensed into water collection unit (200) collects in a conical bottom portion (202) of water collection unit (200). To aid in collection of the heavier "processed" wastewater (004), exemplary water collection unit (200) has a conical bottom portion (203). In various embodiments, at least two water outlets (211, 214), water inlet (212), and deflection plate (213) are located in or near a conical bottom portion (202). Automatic sensor (215) monitors the level of raw or mixed wastewater (001/003) that is present in water collection unit (200), and a controller (900) (see FIG. 7) manages transfer of raw wastewater (001) in and mixed wastewater (003) out at least in part as a function of the level detected.

Raw wastewater (001) is dispensed in a continuous stream from collection unit (200) to vaporization unit (300) through water outlet (211). Likewise, un-vaporized water (003) is received into water collection unit (200) from vaporization unit (300) through water inlet (212) as described in further detail below. Water inlet (212) is located below water outlet (211).

By locating water outlet (211) above water inlet (212), less concentrated (i.e., less dense), mixed wastewater (001/003), which may require additional processing is readily dispensed from water collection unit (200) to vaporization unit (300) through water outlet (211), whereas more concentrated mixed wastewater (001/003) remains towards the bottom of collection unit (200).

Recirculation of un-vaporized water (003) into water collection unit (200) from vaporization unit (300) occurs until mixed wastewater (001/003) is reduced to a certain predetermined level (volume) in water collection unit (200). Resulting processed water (004) is then released from water collection unit (200) through water outlet (214) using any suitable means, such as via gravity feed, utilizing a pump, and combinations thereof, to a storage tank, transport, or other destination, all as will occur to those skilled in the art.

Figure 3:
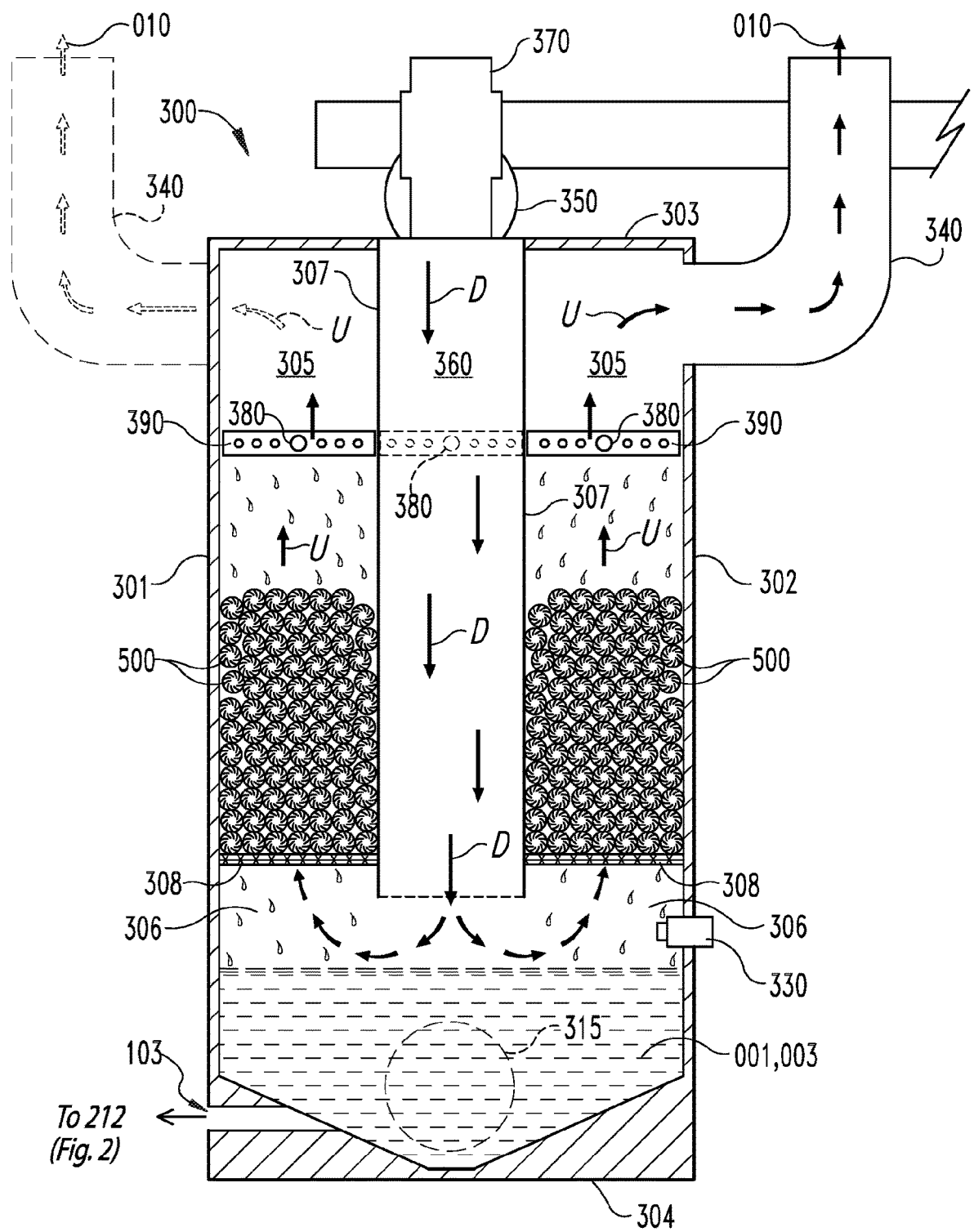
FIG. 3 is a schematic cross-sectional view of an exemplary vaporization unit.

FIG. 3 depicts a cross-sectional view of exemplary vaporization unit (300). Vaporization unit (300) comprises a cylinder (301) defined by contiguous wall (302) connecting top wall (303) of cylinder (301) to bottom wall (304) of cylinder (301).

Cylinder (301) comprises two internal chambers: vapor chamber (305) and separation chamber (306). Vapor chamber (305) is defined between contiguous wall (302) of cylinder (301) and wall(s) (307) of burner tube (360) (described below). Vapor chamber (305) is disposed above separation chamber (306) and is separated from separation chamber (306) by a substrate that allows water and vapor to readily pass therethrough, for example, grating (308) as shown in FIG. 3.

Burner (350) is disposed proximal to top wall (303) of cylinder (301). The exemplary burner may be capable of being fueled by any of a variety of types of fuel, such as propane, methane, or natural gas including without limitation flare gas, though some embodiments will use single-fuel burners as will occur to those skilled in the art. Burner tube (360) extends from burner (350) through top wall (303) of cylinder (301), into and through vapor chamber (305), through grating (308) and partially into separation chamber (306).

Blower (370) is configured to blow heated exhaust and combustion air gases (depicted in FIG. 3 as downward arrows "D") from burner (350) into and through burner tube (360) and out into separation chamber (306). In some embodiments, blower (370) is from PENNBARRY of Plano, Tex. (USA) and has a "silencer" built in to reduce the amount of sound produced, though other products and features will provide this function in other embodiments. The force of blower (370) causes heated exhaust gases to deflect from the bottom wall of the separation chamber, and/or from any un-vaporized water (003) that has collected there, to rise up through grating (308) and through the vapor chamber (depicted in FIG. 3 as upward arrows, labeled "U").

Raw wastewater (001) or mixed wastewater (001/003) is introduced into vaporization unit (300) through one or a plurality of water inlet ports (380) proximal to the top of the vaporization unit (300). Raw wastewater (001) or mixed wastewater (001/003) passes through water distribution system (390) that disperses the wastewater inside vapor chamber (305).

Figure 4A:
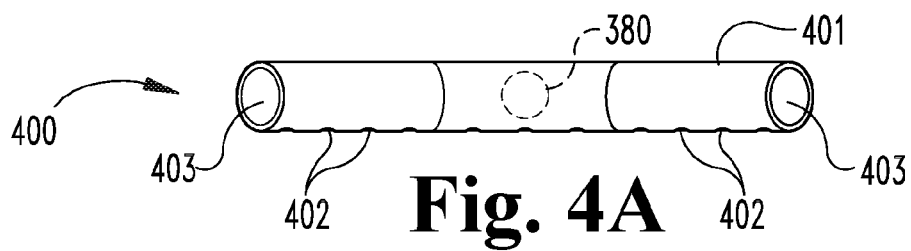
FIGS. 4A, 4B, and 4C are schematic diagrams of components of the vaporization unit of FIG. 3.

Turning for a moment to FIG. 4A, yet with continuing reference to FIG. 3, a front view of water distribution subunit (400) of exemplary water distribution system (390) is shown. Water distribution subunit (400) comprises pipe (401) that is fluidly connected with water inlet port (380). Pipe (401) is perforated with plurality of holes (402) and has open ends (403). When in use, raw wastewater (001) or mixed wastewater (001/003) enters pipe (401) through water inlet port (380), flows through pipe (401) and exits pipe (401) through plurality of holes (402) and/or through open ends (403) of pipe (401) and falls through vapor chamber by gravity (305).

Figure 4B:
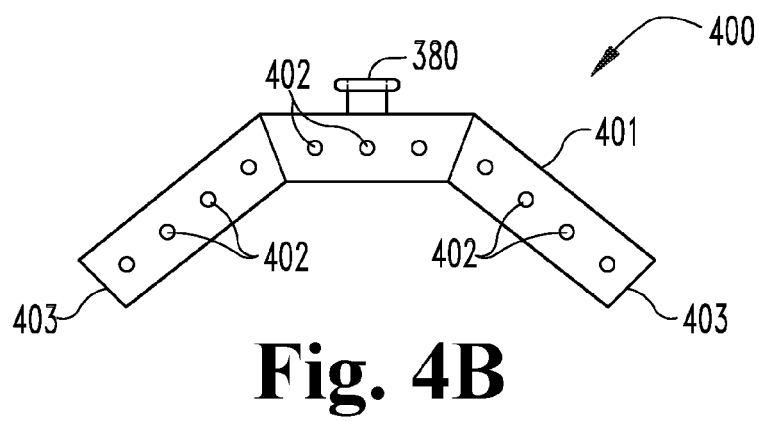

Referencing FIG. 4B, a bottom plan view of water distribution subunit (400) shows that subunit (400) may comprise pipe (401) that is bent to mimic or approximate the inside curvature of contiguous wall (302) of cylinder (303). Alternative configurations of water distribution system (390) that introduce raw wastewater (001) or mixed wastewater (001/003) into vapor chamber (305) will occur to those skilled in the art in view of this disclosure.

Figure 4C:
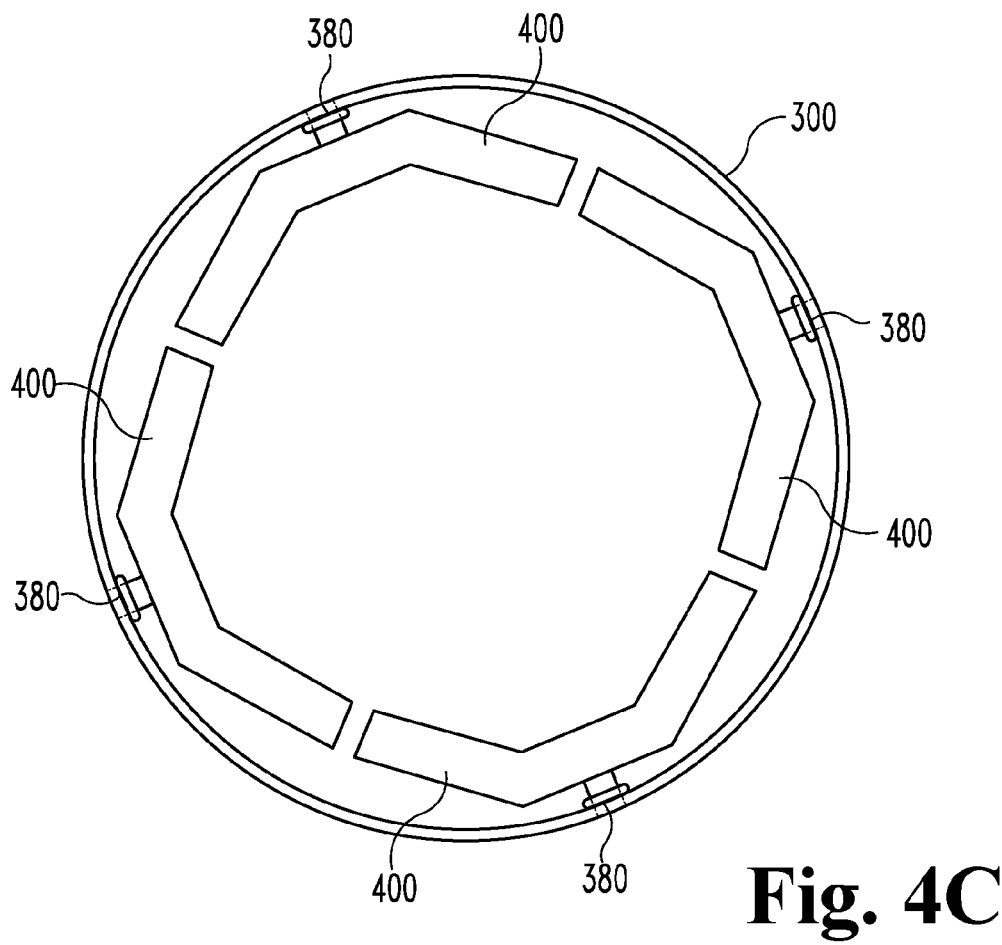

Referencing FIG. 4C, which is a top cross-sectional view looking down into vaporization unit (300), a series of water distribution subunits (400) such as the one shown in FIG. 4B may be distributed around the inside of contiguous wall (302) of cylinder (303) in order to distribute raw wastewater (001) or mixed wastewater (001/003) evenly throughout vapor chamber (305).

Advantageously, wastewater processing system (1000) in accordance with the present disclosure vaporizes raw wastewater (001) and mixed wastewater (001/003) as it falls due to gravity without the need to pressurize vaporization unit (300). Consequently, wastewater processing system (1000) may operate at approximately atmospheric pressure, thereby eliminating any danger or inconvenience that might be associated with pressurizing the vaporization unit (300).

Wastewater processing system (1000) vaporizes raw wastewater (001) and mixed wastewater (001/003) by exposing it to heat at one or more loci. For example, referencing FIG. 3, heated exhaust gases traveling through burner tube (360) may heat walls (307) of burner tube (360). Raw wastewater (001) or mixed wastewater (001/003) contacting or passing close to walls (307) of burner tube (360) may absorb heat therefrom. Additionally or alternatively, raw wastewater (001) or mixed wastewater (001/003) falling through vapor chamber (305) may absorb heat from heated exhaust gas that is deflected from bottom wall (304) of the separation chamber (306) and/or from any non-vaporized wastewater (003) that has collected there and that rises up through grate (308) and through vapor chamber (deflected exhaust gas depicted in FIG. 3 as upward arrows, labeled "U"). Additionally or alternatively, un-vaporized water (003) collected in separation chamber (306) may absorb heat from heated exhaust gas that is exiting burner tube (360) when it contacts the surface of un-vaporized water (003) (downward-moving exhaust gas being depicted in FIG. 3 as downward arrows, labeled "D"). Exposure of raw wastewater (001) or mixed wastewater (001/003) to heat at one or more of these points causes at least a portion of the same to form water vapor (010). Water vapor (010) exits vaporization unit (300) and wastewater processing system (1000 in FIG. 1) and passes into the atmosphere through at least one vent (340) and, in exemplary wastewater processing system (1000) shown in FIG. 3, two vents (340). In some embodiments, an exhaust fan is included within or adjacent to the at least one vent (340) to assist with drawing steam out of the at least one vent (340) and into the atmosphere.

Figure 5B:
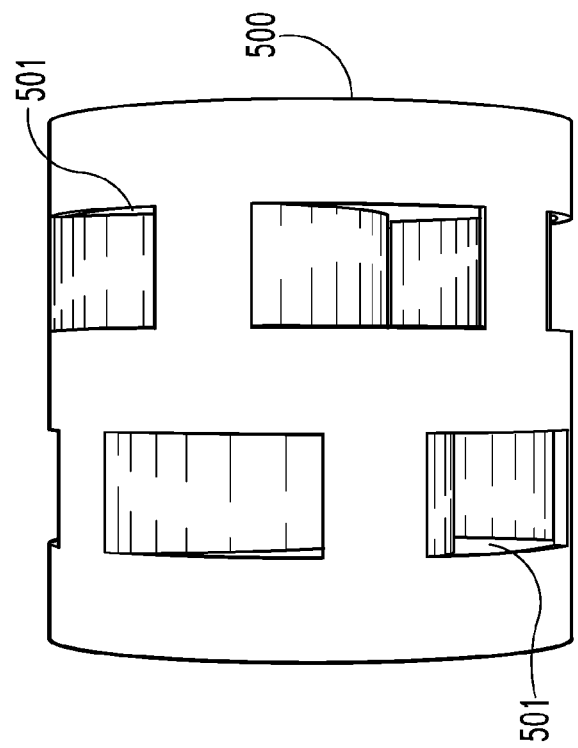
FIGS. 5A and 5B depict an exemplary pall ring.
Figure 5A:
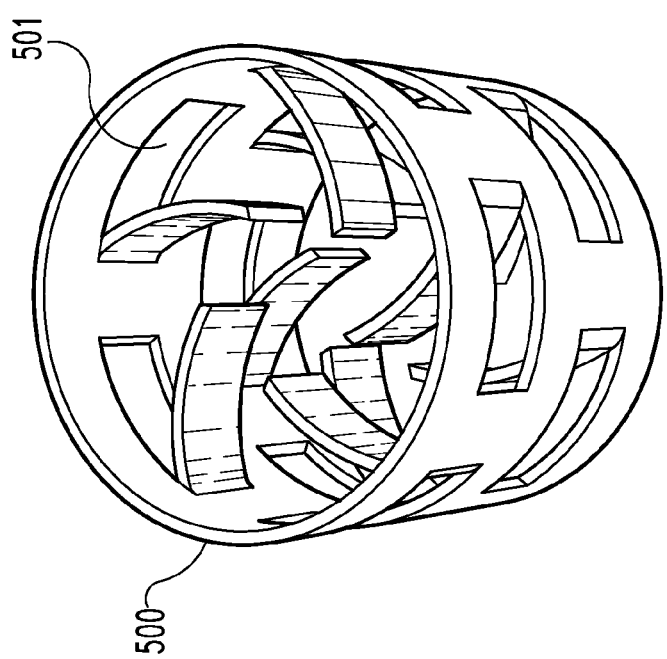

To prolong exposure time of raw wastewater (001) or mixed wastewater (001/003) to heated exhaust gases as the water and gasses concurrently pass through vapor chamber (305), one or more baffles may be disposed in vapor chamber (305). For example, in vaporization unit (300) shown in FIG. 3 for exemplary wastewater processing system (1000) in FIG. 1, vapor chamber (305) is at least partially filled with a plurality of pall rings (500), such as the stainless steel pall ring (500) shown in FIG. 5, a CHRISTYPAK metal pall ring made of 304 stainless steel and having a nominal outer diameter of 1.5" distributed by Christy Catalytics, St. Louis, Mo. Because each pall ring (500) comprises a plurality of openings (501) and exposes substantial surface area, when such pall rings (500) are distributed inside vapor chamber (305), such pall rings (500) retain heat from heated exhaust gas passing through, induce turbulence in the heated exhaust gas, and greatly increase the heated surface area to which the water passing therethrough is exposed. Such heat retention, turbulence, and increased heated surface area promote more efficient heat transfer between heated exhaust gas and water (001/003), which may in turn result in increased vaporization of raw wastewater (001) or mixed wastewater (001/003).

Even with the increased turbulence and heat transfer caused by pall rings (500) in vapor chamber (305), only a portion of raw wastewater (001) or mixed wastewater (001/003) becomes water vapor (010) as it passes through vapor chamber (305). For example, in some embodiments in which about 50 gpm of mixed wastewater (001/003) is introduced into vaporization unit (300), only about 6 gpm to 15 gpm of wastewater might be vaporized and released into the atmosphere. Un-vaporized water (003) collects in separation chamber (306) of vaporization unit (300). Presence of un-vaporized water (003) in separation chamber (306) may provide a number of benefits including, but not limited to collecting and concentrating remaining TDS, TSS, and/or VOCs for subsequent processing or disposal and cooling vaporization chamber (300) to desired operational levels.

The level of un-vaporized water (003) in separation chamber (306) is monitored using automated sensor (330). Once the level of un-vaporized water (003) is above a predetermined depth, a controller (900) (see FIG. 7) transfers excess un-vaporized water (003) from separation chamber (306) back to water collection unit (200) via water inlet (212) for subsequent processing or disposal. Since un-vaporized water (003) is heated while it is in vaporization unit (300) as described above, when it is returned to the water collection unit (200) and mixed with raw wastewater (001) or mixed wastewater (001/003) already present in water collection unit (200), further heat transfer occurs, thus raising the temperature of the next aliquot of mixed wastewater (001/003) to be transferred into vaporization unit (300), thereby driving efficiency in subsequent vaporization of mixed wastewater (001/003) therein.

In this illustrated embodiment, when sufficient raw wastewater (001) or mixed wastewater (001/003) has been vaporized, or sufficient time has passed, or for other reasons understood by those skilled in the art, wastewater processing system (1000) may be shut down, either automatically under the control of a controller (900) (see FIG. 7) or under user control. Depending on the implementation and/or context, raw wastewater (001) and mixed wastewater (001/003) ceases to be delivered to vaporization unit (300), and the system continues to operate burner (350) and blower (370) for a period of time while the raw wastewater (001) and mixed wastewater (001/003) passes through vapor chamber (305). Burner (350) and blower (370) are then turned off, and the raw wastewater (001) and mixed wastewater (001/003) in separation chamber (306) is transferred back to water collection unit (200) via water inlet (212).

Exemplary vaporization unit (300), shown in FIG. 3, comprises a cleaning port (315) in separation chamber (306). If, for example, un-vaporized water (003) present in separation chamber (306) becomes saturated with other materials, e.g., if chloride and solids precipitate from un-vaporized water (003), unwanted deposits may occur inside separation chamber (306). In these and other circumstances, cleaning port (315) may be useful since it allows ready access into separation chamber (306) for cleaning and other purposes.

Figure 6:
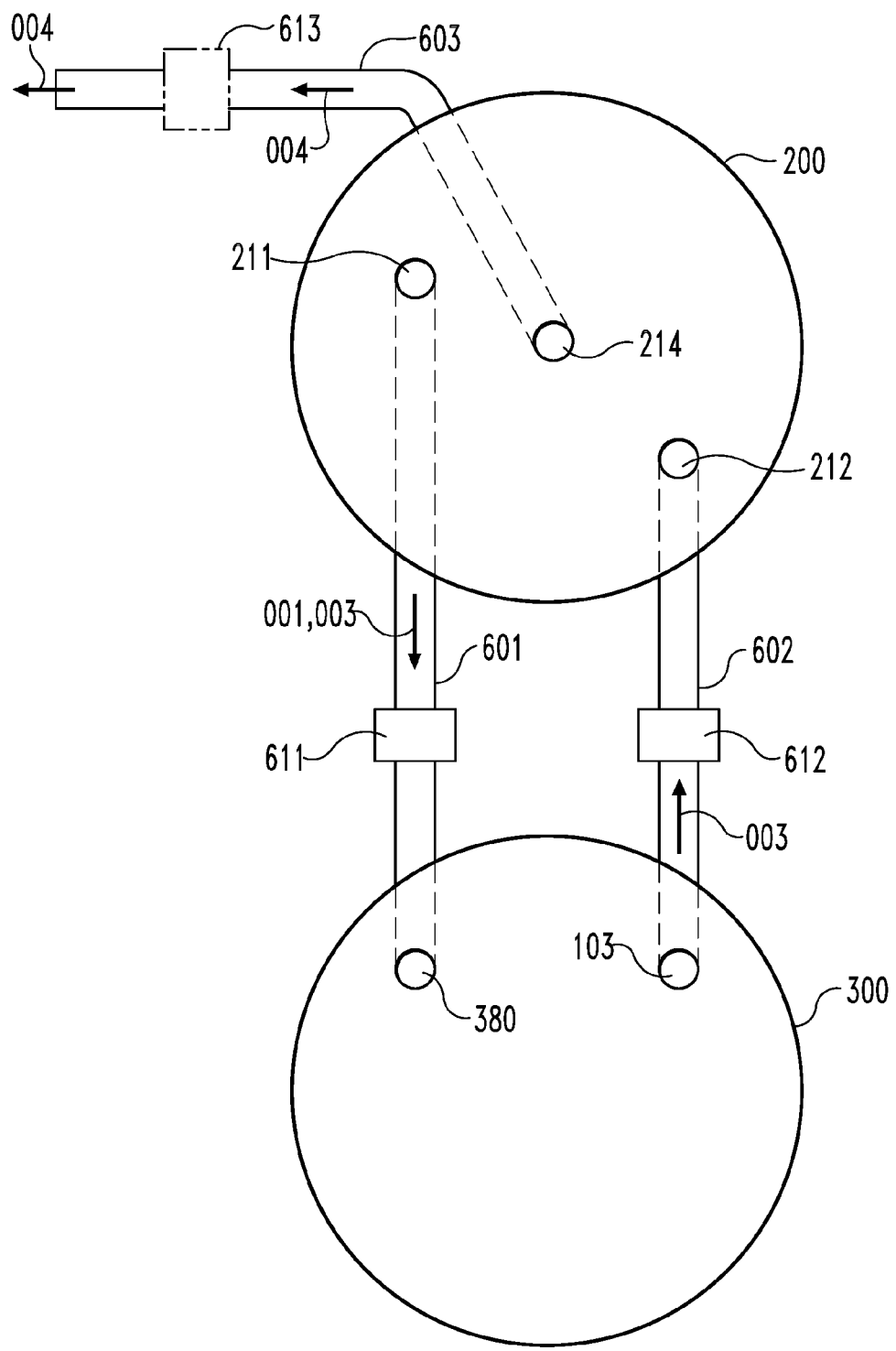
FIG. 6. is a plan view of an exemplary water transfer system of use in a wastewater processing system of FIG. 1.

FIG. 6 is a top plan view of exemplary water transfer system (600) for transferring raw wastewater (001) and mixed wastewater (001/003) between water collection unit (200) and vaporization unit (300). Exemplary water transfer system (600) may be useful when wastewater processing system (1000) is deployed on a trailer or truck bed as described in further detail below.

Exemplary water transfer system (600) comprises a series of hoses and/or pipes (601, 602, 603) and pumps (611, 612, 613). Raw wastewater (001) or mixed wastewater (001/003) is dispensed from collection unit (200) through water outlet (211), through tube (601) via pump (611), through water inlet (380) and into vaporization unit (300). Un-vaporized water (003) is dispensed from vaporization unit (300) through water outlet (103), through tube (602) via pump (612), through water inlet (212) and into collection unit (200). Processed water (004) is dispensed from collection unit (200) through water outlet (214), through tube (603) via gravity and/or pump (613).

Electrical and electromechanical components of wastewater processing system (1000) may be connected to and controlled by a control system. The control system comprises modules to functionally execute steps of processing of raw wastewater (001). The control system may include an operating conditions module, a user request module, a processing control module, an actuation module, and other modules known to those skilled in the art. The operating conditions module interprets operating conditions, such as temperatures, pressures, water and gas flow rates, presence of unwanted gases, e.g., carbon dioxide, hydrogen sulfide, and the like, by reading various sensor outputs, receiving data messages over a network, and/or through any other method understood in the art. The user request module interprets at least one user request, which, in the present embodiment, includes a target parameter value, for example, a processing target (in terms of weight, volume, or other metric) or time target. The user request module may process the user request by sending a data message over a network, by comparing an operating condition to a pre-calibrated value, or the like. Without limitation, a user of the request module may be a person, but may also be an application, a computer in communication with the application, and/or a computer in use by a person (not shown) monitoring the system, and the request may be produced in a direct response to an action by the user, may be scheduled, or may otherwise be programmatically generated as will occur to those skilled in the art.

The control system may further include a network that connects more than one computer to each other and to the control system. Additionally, the network may connect modules within the control system to each other and may connect the control system to wastewater processing system (1000). The network may comprise multiple components, for example a LAN, WAN, satellite connection, the internet, and communications within a server and/or computer. Since the control system may allow for wastewater processing systems (1000) to be controlled remotely, it may eliminate the need for having personnel physically present to operate wastewater processing operations.

Wastewater processing systems (1000) according to the present disclosure may be configured and installed in a container such that the systems (1000) are mobile. For example, mobile wastewater processing systems (1000) may be hauled to a site utilizing a commercial semi, pickup truck, or other motor vehicle capable of holding and/or towing wastewater processing systems (1000) when they are disposed on a trailer. Alternatively, wastewater processing systems (1000) may be airlifted to remote locations via helicopter or cargo plane. Thus, wastewater processing systems (1000) may be delivered directly to where raw wastewater (001) is generated, including but not limited to the site of an oil or gas well, industrial processing facility, landfill leachate pool, livestock wastewater holding ponds, and/or naturally occurring water source. Consequently, wastewater processing systems (1000) may eliminate or substantially reduce the need to ship wastewater from sites, and be especially advantageous at remote sites, thus eliminating or simplifying often complex logistical issues and the associated costs.

Figure 7:
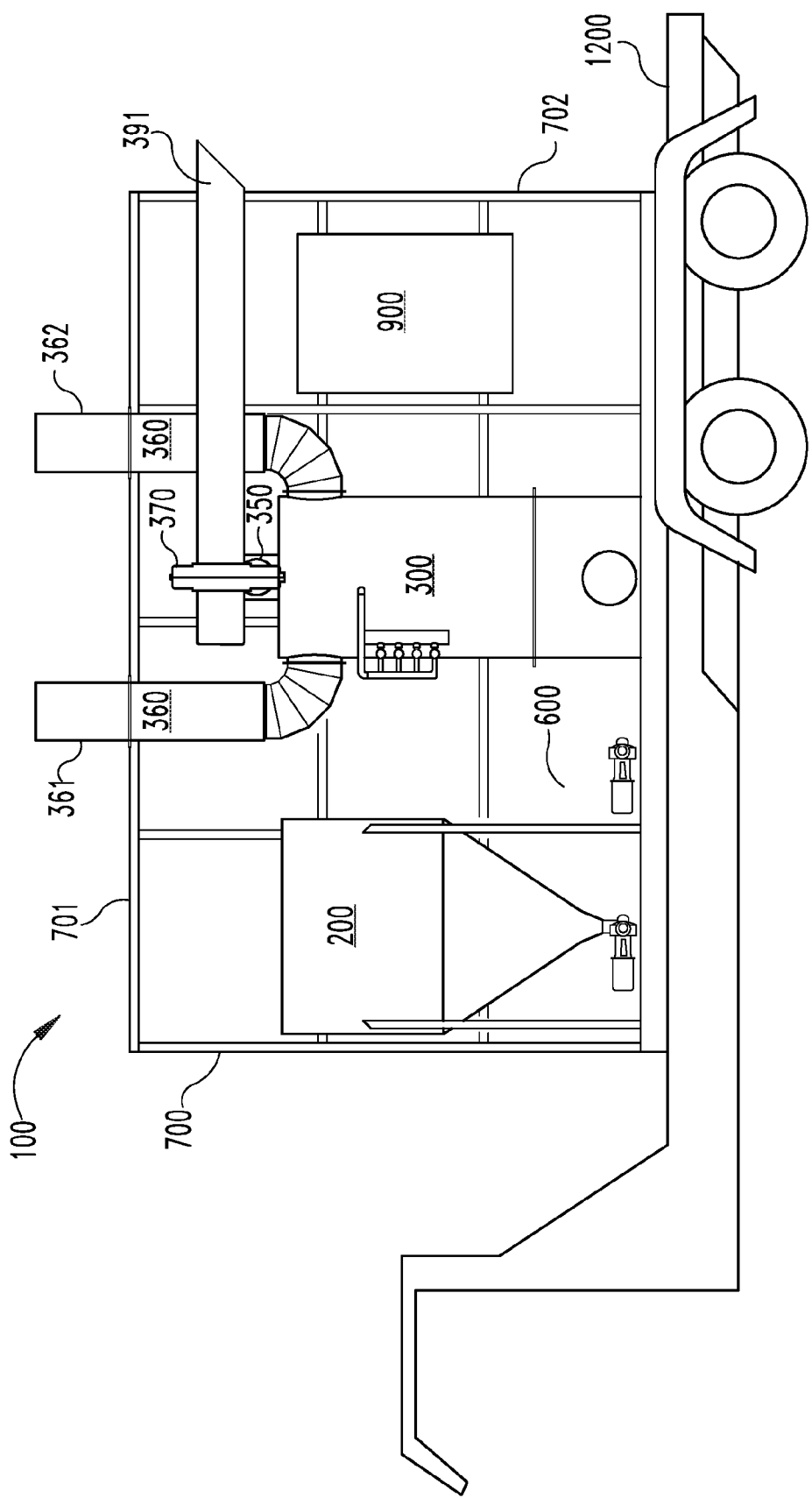
FIG. 7 is a schematic cross-sectional view of an exemplary wastewater processing system that is mobile.

FIG. 7 is a schematic cross-sectional view of an exemplary mobile implementation of wastewater processing system (1000). This exemplary container (700) is approximately 8 feet wide, 24 feet long, and 13 feet high (8'×24'× 13') but might be smaller. The small size of the container facilitates easier transport and use in numerous applications.

FIG. 7 depicts exemplary wastewater processing system (1000) that is disposed in container (700), where internal structural components may be made of stainless steel, and the panel walls may be made of stainless steel sheets on the interior with a one-inch polystyrene insulation layer and exterior panels of 18-gauge Kynar-coated galvanized steel. Other embodiments will use different sizes, materials, configurations, and coatings as will occur to those skilled in the art. In this embodiment, container (700) contains collection unit (200), vaporization unit (300), control panel with controller (900), water transfer system (600), burner (350) and blower (370).

In the example shown in FIG. 7, vaporization unit (300) has two exhaust tubes (360), each respectively comprising a stack (361, 362). Container (700) is configured such that stacks (361, 362) exit through the top (701) of container (700). Stacks (361, 362) are operable such that water vapor is passed from stacks into the atmosphere. In some implementations, stacks (361, 362) are "no-loss" stacks that collect heavy compounds, condensate water, and other liquids they encounter into collection unit (200) as discussed below in relation to FIG. 8. In other implementations, stacks (361, 362) simply allow such materials to escape with the vapor.

In the example shown in FIG. 7, blower (370) is fluidly connected to ventilation pipe (391), which extends through container (700) and passes outside of side wall (702) of container (700), where it is exposed to the atmosphere outside of container (700). Ventilation pipe (391) is configured to feed blower (370) with air from the atmosphere outside of container (700).

In the example shown in FIG. 7, container (700) is disposed on the bed of a commercially available trailer (1200) that may be hauled by pickup truck, a semi, or another vehicle with sufficient towing capacity. Thus, exemplary wastewater processing system (1000) shown in FIG. 7 is mobile and may be delivered directly to the site of a well or other source of wastewater, where it may be used to process wastewater. Water vapor (010) may be released from wastewater processing system (1000) on site, thus eliminating the requirement to store and/or haul much of the produced water away from the site. By vaporizing the water and releasing the water vapor, raw wastewater (001) may be reduced in volume by up to approximately 95%, leaving only the "processed" water (004) (in volumes as low as $\frac{1}{20}^{th}$ of the original volume of wastewater (001)) to be disposed of by conventional measures. Once wastewater processing at a given site is completed, wastewater processing system (1000) may subsequently be moved to other sites to process wastewater as needed.

Figure 8:
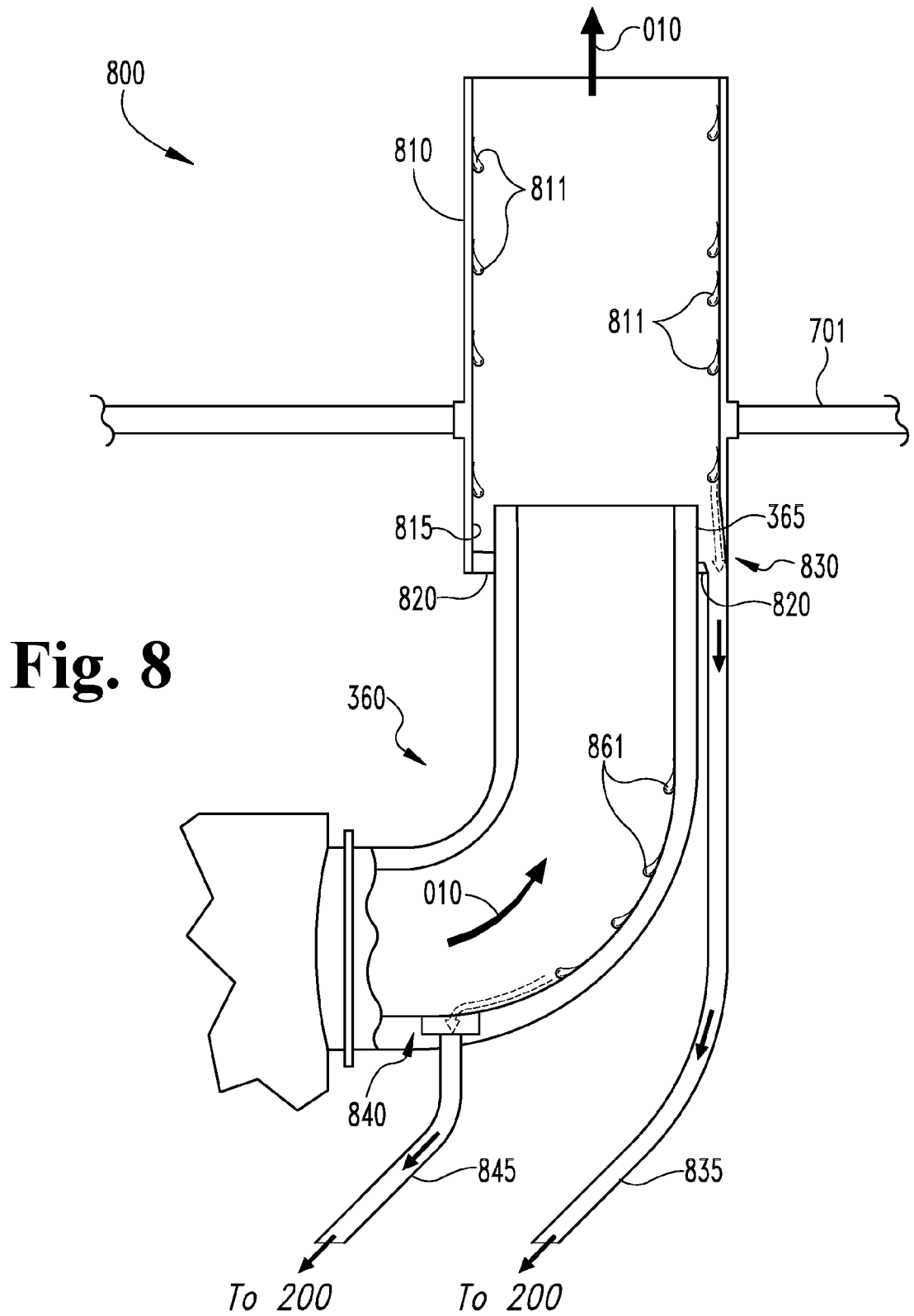
FIG. 8 is a side cross-sectional view of an exemplary exhaust stack of use in a wastewater processing system of FIG. 1.

FIG. 8 illustrates a no-loss stack assembly (800) used in some embodiments of the present invention. Stack assembly (800) comprises stack pipe (810) that extends through the top (701) of container (700) illustrated in FIG. 7. Stack pipe (810) extends burner tube (360) but has a slightly larger diameter so that some space is left between the outside (365) of the end of burner tube (360) and the inside (815) of the bottom (820) of stack pipe (810). The bottom (820) of stack pipe (810) directs water (811) (such as condensed water vapor (010) or atmospheric precipitation) that collects on the inside surface of stack pipe (810) to a drain feature (830), which is connected by tube (835) to raw wastewater inlet (210) or another inlet to top portion (201) of water collection unit (200). Another drain feature (840) at or near the bottom of the bend in burner tube (360) collects water (861) (again, condensed water vapor (010) or atmospheric precipitation) and guides it via tube (845) to raw wastewater inlet (210) or another inlet to top portion (201) of water collection unit (200). In some embodiments, these tubes (835, 845) from all stacks (360) are combined into one or two inlets, while in others the tubes (835, 845) each feed their own inlet, and in still others the drains have a different configuration as will occur to those skilled in the art.

In various embodiments, wastewater processing system (1000) is powered by electrical power that is present at many production sites, a generator that operates on the oil or natural gas that is being generated at the site, or by other means that will occur to those skilled in the art in view of this disclosure. Similarly, the fuel used by burner (350) may be propane, methane, or natural gas (including flare gas) and be supplied by a separate tank or utility connection, by the fuel being produced at the site, or by other means that will occur to those skilled in the art. In some embodiments, burner (350) is adapted to use any of a plurality of different types of fuel, such as a 10 MM BTU MAXON OVENPAK LE EB100 Natural Gas Burner with standard mixing cone, short flame type 310 stainless steel burner sleeve, direct spark with flame rod ignition, all from Honeywell (Muncie, Ind.). Other multi-fuel burners and single-fuel burners may be used in other embodiments as will occur to those skilled in the art.

In various embodiments, sensors (215) and (330) are radar sensors such as the VEGAPULS 64 distributed by VEGA Grieshaber KG (Schiltach, Germany). In other embodiments, other radar sensors or other types of sensors are used to monitor the levels of liquids in the bottom of water processing unit (200) and vaporization unit (300), which might use the same or different types of sensors.

As described above with respect to FIG. 3, burner tube (360) extends from burner (350) through top wall (303) of cylinder (301), into and through vapor chamber (305), through grating (308). Because burner tube (360) is configured to transport heated exhaust and combustion air gases (depicted in FIG. 3 as downward arrows "D"), it would desirable to provide various safeguards to prevent burner tube (360) from deteriorating and/or failing due to the repeated exposure to alternating temperatures, thus experienced repeated occurrences of the materials forming burner tube (360) expanding and contracting, as well as vibrations associated with operation of blower (370) and other components of the system.

Figure 9:
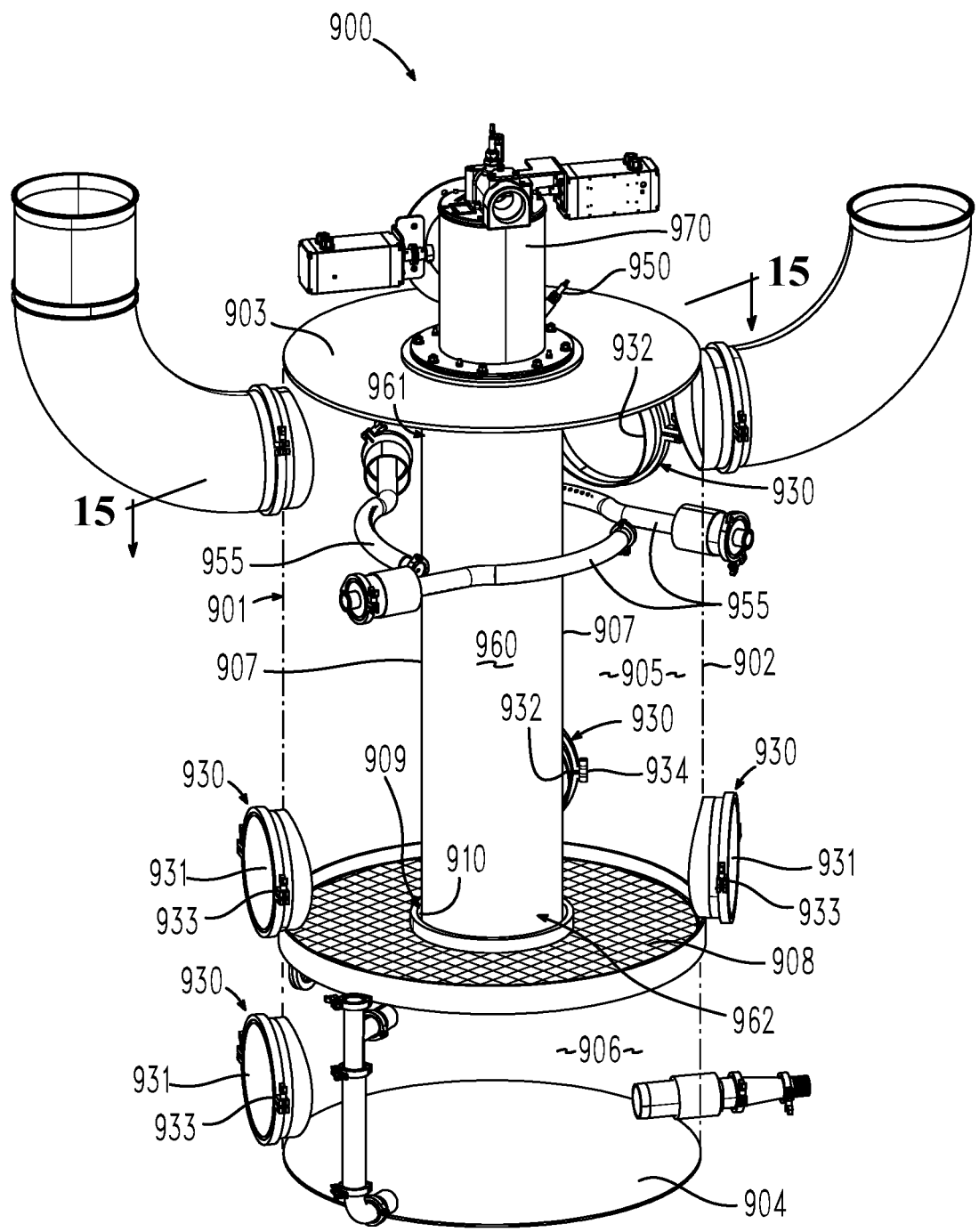
FIG. 9 is a side elevation view of another exemplary vaporization unit, with the outer cylinder shown transparent, shown with the pall rings removed.

FIG. 9 illustrates an alternative embodiment of a vaporization unit (900). Vaporization unit (900) includes the same features and functions as vaporization unit (300), unless otherwise described, and may be utilized in place of vaporization unit (300). Particularly, vaporization unit (900) includes a cylinder (901) defined by contiguous wall (902) connecting top wall (903) of cylinder (901) to bottom wall (904) of cylinder (901). Cylinder (901) comprises two internal chambers: the upper vapor chamber (905) and lower separation chamber (906). Vapor chamber (905) is defined between contiguous wall (902) of cylinder (901) and wall(s) (907) of burner tube (960). Vapor chamber (905) is disposed above separation chamber (906) and is separated from separation chamber (906) by a substrate that allows water and vapor to readily pass therethrough, for example, grating (908).

Burner (950) is disposed proximal to top wall (903) of cylinder (901). The exemplary burner (950) may be capable of being fueled by any of a variety of types of fuel, such as propane, methane, or natural gas including without limitation flare gas, though some embodiments will use single-fuel burners as will occur to those skilled in the art. Burner tube (960) extends from burner (950) through top wall (903) of cylinder (901), into and through vapor chamber (905), through grating (908) and partially into separation chamber (906). Similar to blower (370), blower (970) is configured to blow heated exhaust and combustion air from burner (950) into and through burner tube (960) and out into separation chamber (906). The force of blower (970) causes heated exhaust gases to deflect from the bottom wall of separation chamber (906), and/or from any un-vaporized water that has collected there, to rise up through grating (908) and through the vapor chamber (905).

To help to prevent burner tube (960) deterioration, and to thereby increase the lifespan of burner tube (960), burner tube (960) may be configured in a "floating" or suspended position. For instance, the top end (961) may be configured to securely attach to connecting top wall (903) while the bottom end (962) may be configured to hang freely. In this configuration, top end (961) may be securely fastened to connecting top wall (903) using bolts, screws, welds, clamps, or any other common materials or methods for securing top end (961). On the other hand, bottom end (962) may simply be guided into a position, rather than secured or fastened into position. In the illustrated embodiment, grating (908) includes a central opening (909) shaped to receive bottom end (962) of burner tube (960) therethrough. To guide burner tube (960) through central opening (909) while restricting unwanted movement from burner tube (960), central opening (909) may be shaped having a slightly larger diameter in relation to the outer diameter of burner tube (960), without being too snug as to restrict periodic expanding and contracting of burner tube (960) as temperatures of the materials increase and decrease. As such, it should be understood that the relative sizing of central opening (909), and in particular the amount of expansion gap (910) in relation to burner tube (960) depends on the expansion properties of the materials forming burner tube (960) and expected temperatures of the application.

Similar to vaporization unit (300) of FIG. 3, vaporization unit (900) comprises a variety of process components including one or more spray nozzles (955), which perform the same function and replace pipes (401). The spray nozzles (955) are used to spray the wastewater that is to be treated into the water vaporization chamber for vaporization. Due to the heavy mineral content of the water that is sometimes treated, these spray nozzles (955) are prone to fouling due to accumulation of mineral build-up, debris, and other contaminants in the wastewater stream. For this reason, it is necessary to clean these nozzles periodically. Depending on the amount of solids and other materials that are in the water, frequent cleaning may be required, resulting in inefficient operations and requiring extensive maintenance expenses. Typically, in existing water processing systems, the system must be shut down to clean the nozzles. Further, the nozzles must be removed and replaced, or removed and cleaned.

Cylinder (901) of vaporization unit (900) may further include one or more quick-access features (930). Quick-access features (930) may be positioned to allow access to vapor chamber (905) and/or separation chamber (906). Periodically, the pall rings that are positioned within vapor chamber (905), such as the stainless-steel pall ring (500) shown in FIG. 5, require removal for cleaning and/or replacement. Quick-access features (930) may provide a user with an efficient way to access the pall rings to provide those functions. As such, quick-access features (930) each include a door (931), such as a hinged door pivotable about a hinge (934), having a securable latch (933) that allows the door (931) to swing open outwardly to provide a user with access to vapor chamber (905) through a through-hole (932). Alternatively, door (931) may be able to disconnect entirely from quick-access feature (930), such as by including more than one latch or clamp (933) to secure door into place at opposing edges (see FIGS. 10A and 10B). For instance, door (931) of quick-access feature (930) may take the form of a separable plate configured to cover the access opening and be securable thereto by tri-clover clamps (933), optionally including a gasket (not shown) positioned between door (931) and the edges of the access opening to ensure quick-access features (930) remain leak-free. As shown, one or more quick-access doors (930) may also be positioned on cylinder (901) adjacent separation chamber (906) to provide functions similar to cleaning port (315) of vaporization unit (300).

Figure 10A:
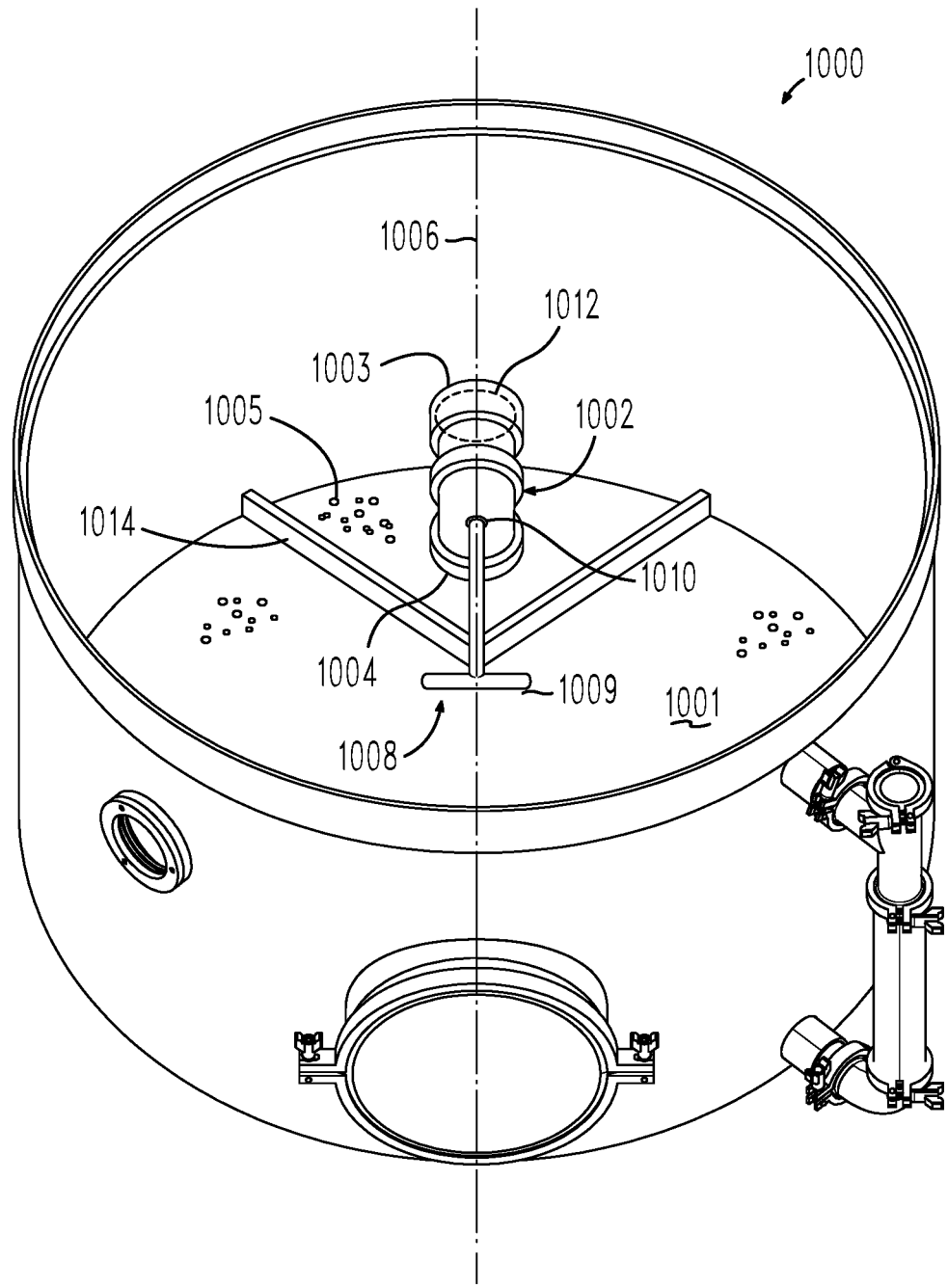
FIGS. 10A and 10B are side elevation views of an alternative exemplary separation chamber, shown with the vapor chamber and burner tube removed for clarity.
Figure 10B:
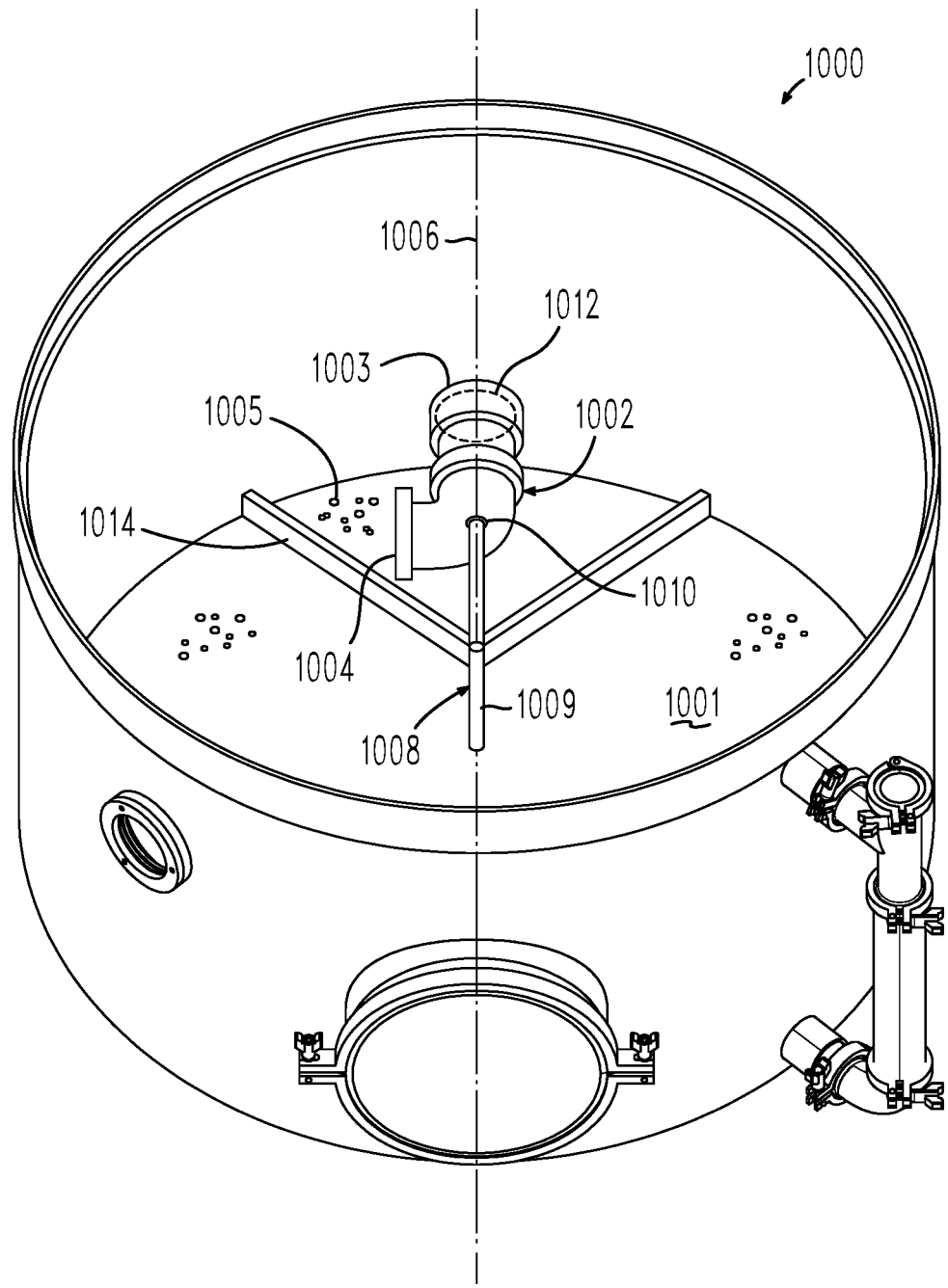

FIGS. 10A-B illustrate a separation chamber (1000) in an alternative embodiment. Separation chamber (1000) may form the lower portion of vaporization unit (900) in place of separation chamber (906). Particularly, separation chamber (1000) is shown with the vapor chamber (905) and burner tube (960) each removed for clarity. Separation chamber (1000) includes an elbow pipe (1002) having a first end (1003) defining a fluid exit opening (1012), which is fluidly coupled with exterior piping and configured to function as a fluid outlet similar to fluid outlet (103), and an open second end (1004) for sucking or otherwise drawing fluid from the lower portion of separation chamber (1000) for expelling it outward from the fluid outlet.

In some applications, sediment (1005) may collect on the floor (1001) of separation chamber (1000) during operation. As such, elbow pipe (1002), which is configured with an "L" or elbow shape, may be rotated about an axis (1006) between first and second rotational positions (as shown in the progression from FIG. 10A to FIG. 10B) defined centrally relative to the fluid outlet opening on first end (1003) to reduce or prohibit sediment from being sucked or otherwise drawn from floor (1001) of separation chamber (1000) and expelled through opening (1012) via elbow pipe (1002). To rotate elbow pipe (1002) about axis (1006), an adjustment rod (1008) may be included with a handle (1009) at one end and a connection feature (1010) at the opposing end. Connection feature (1010) allows adjustment rod (1008) to be selectively coupled with elbow pipe (1002) so a user may adjust the angle of the elbow as desired.

To further reduce or prevent sediment (1005) from being expelled from separation chamber (1000) through elbow pipe (1002), a solids dike (1014) may be included at or near first end (1003) to block solids from flowing through the fluid outlet (1012) while allowing liquids to freely pass.

In some circumstances during operation of separation chamber (1000), fluid may develop a circular swirl relative to floor (1001) within separation chamber (1000) as un-vaporized water (003) is dispensed through elbow pipe (1002). To reduce or prevent this fluid swirl, solids dike (1014) may be further configured to function as a baffle, extending vertically upward from floor (1001), to interrupt fluid swirl. It should be understood that dike and baffle (1014) may be formed in a "V" shape as shown to assist with the blocking of solids, or it may be formed in any other shape or have an alternative height from floor (1001) that would be effective for reducing fluid swirl and liquid movement within separation chamber (1000) while also preventing solids from entering elbow pipe (1002).

Figure 11:
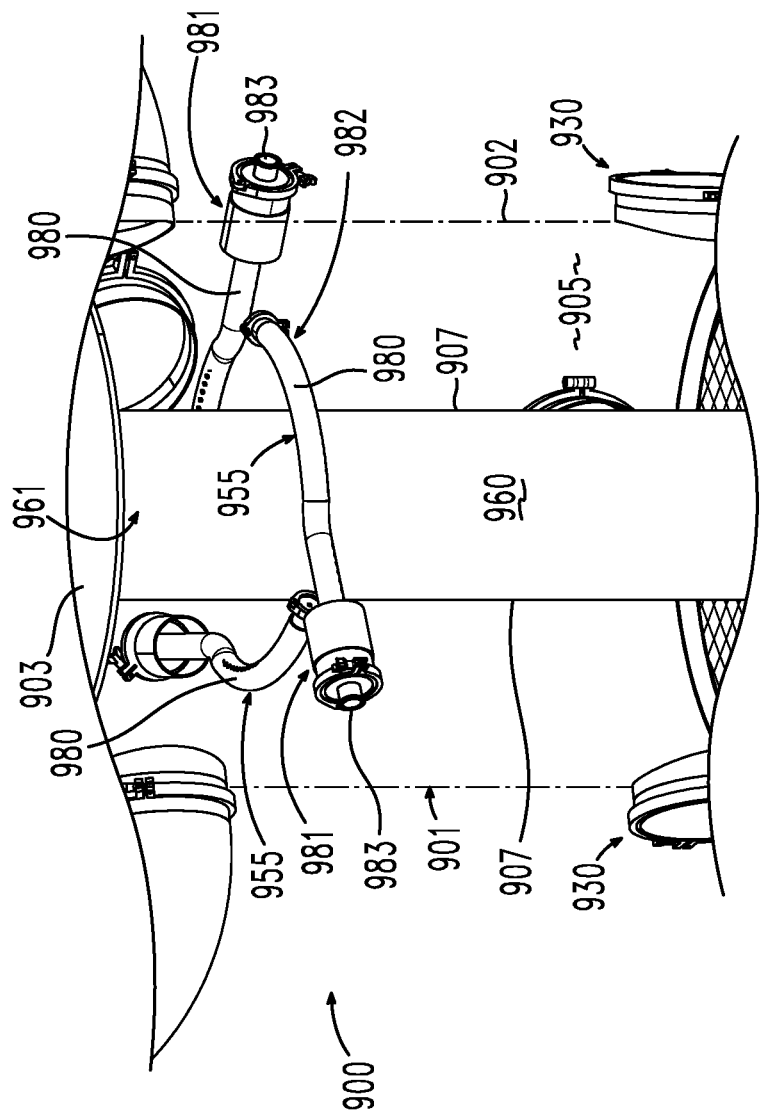
FIG. 11 is a perspective cutaway view of the vaporization unit of FIG. 9.
Figure 12:
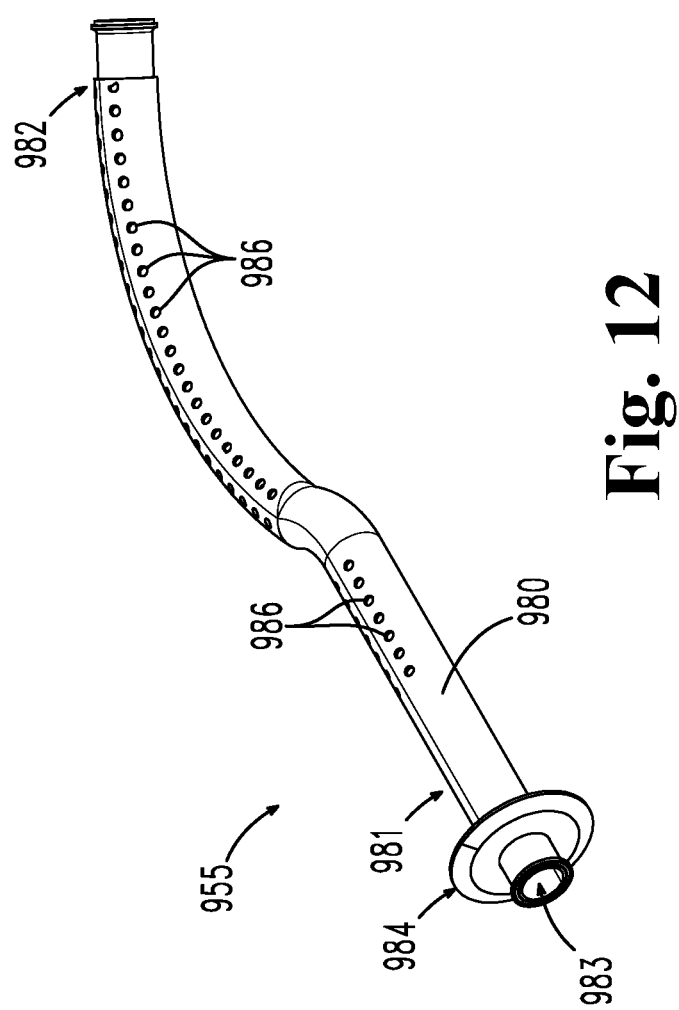
FIG. 12 is a perspective view of one spray rail assembly of FIG. 11, shown removed from the vaporization unit.
Figure 13:
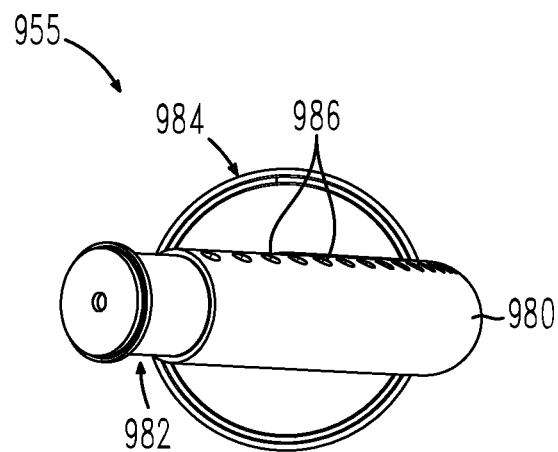
FIG. 13 is a first end view of one spray rail assembly of FIG. 11, shown removed from the vaporization unit.
Figure 14:
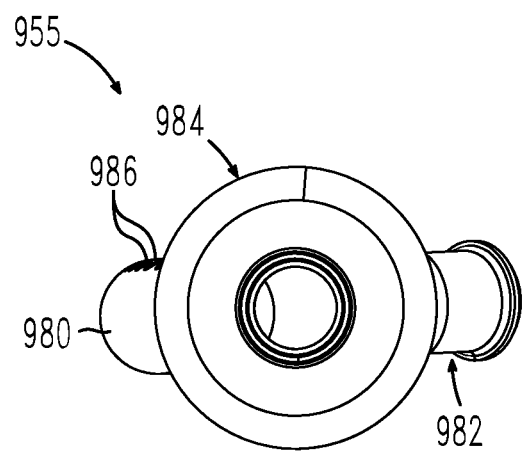
FIG. 14 is a second end view of one spray rail assembly of FIG. 11 opposite the end of FIG. 13, shown removed from the vaporization unit.
Figure 15:
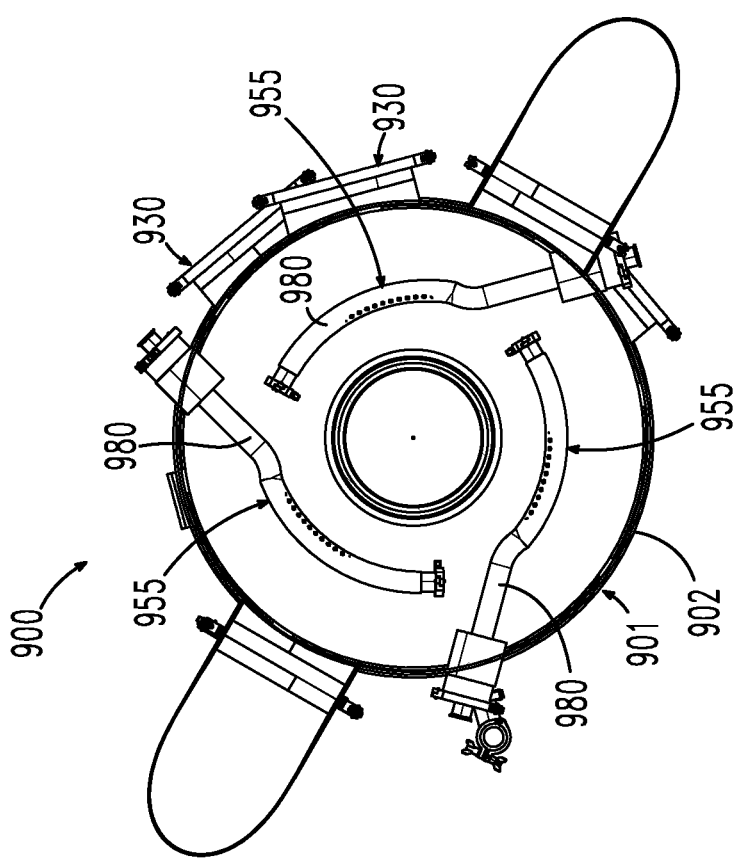
FIG. 15 is a cross-sectional view of the vaporization unit of FIG. 9 taken along line 15-15 of FIG. 9.

FIGS. 11-15 illustrate various components and methods relating to the spray rail assemblies (955) for use with vaporization unit (900). Specifically, one or more alternative spray rail assemblies (955) may be inserted into vaporization chamber (905) for introducing wastewater. Spray rail assemblies (955) are configured so that they can be easily removed and maintained or replaced, as needed. With reference to FIG. 11, spray rail assembly (955) comprises a rail pipe (980) with a first end (981) and a second end (982). Spray rail assembly (955) may be hollow to therefore permit wastewater to be transferred through spray rail assembly (955). Wastewater enters spray rail assembly (955) at first end (980) through water inlet (983). As the wastewater is typically pressurized, it is pushed through rail pipe (981) and through spray rail assembly (955), and it exits spray rail assembly (955) through the plurality of spray nozzles (986). Second rail end (982) may be a solid cap to prevent wastewater from exiting spray rail assembly (955) through the end, or it may incorporate another nozzle (986) at its end.

In some embodiments, rail pipe (980) of spray rail assembly (955) includes a curved body to allow for a better fit within the vapor chamber (905). In one example, three spray rail assemblies (955) may be utilized, with each spray rail assembly (955) configured to curve approximately ⅓ of the distance around burner tube (960). Curved body of rail pipe (980) further ensures wastewater expelled from spray rail assembly (955) is expelled from a central position between burner tube (960) and cylinder (901) (see, FIG. 15). Still further, the curved body of rail pipe (980) also ensures that one may efficiently insert and remove spray rail assembly (955) into and from vapor chamber (905) through its respective access opening. A flange assembly (984) provides a mounting structure for attaching spray rail assembly (955) to an exterior surface of cylinder (901). Particularly, flange assembly (984) is affixed or otherwise secured with spray rail assembly (955) near first end (981) of the spray rail assembly.

Rail pipe (980) of spray rail assembly (955) includes a plurality of spray nozzles (986) that are dispersed along the length of rail pipe (980). In one embodiment, spray nozzles (986) are holes drilled through the surface of rail pipe (980) to allow wastewater from inside rail pipe (980) to spray into vapor chamber (905) via spray nozzles (986). It should be understood that, in alternative versions, it may be desired to use replaceable nozzle assemblies or other openings in lieu of drilled holes in rail pipe (980).

Figure 16:
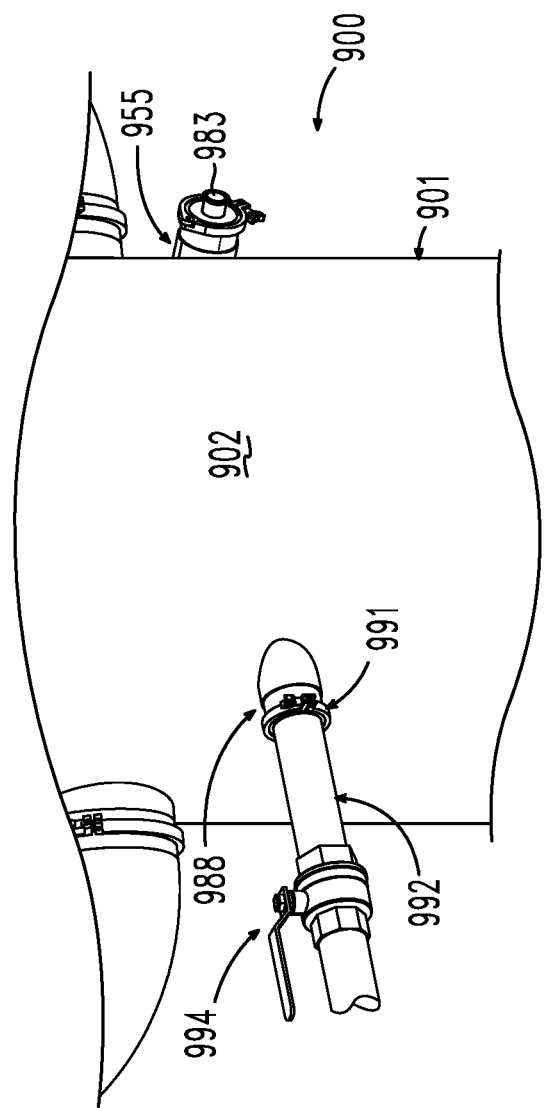
FIG. 16 is a perspective view of the vaporization unit of FIG. 9, showing a water supply coupled with one of the spray rail assemblies.

As illustrated in FIG. 16, a wastewater supply line (992) enters the spray rail receiving assembly (988) and is affixed to the assembly by the spray rail assembly clamp (991). Spray rail water supply line (992) further comprises a spray rail water supply shutoff valve (994). In some embodiments, each of the plurality of spray rail assemblies (955) would have its own individual water supply shutoff valve (994). Water supply shutoff valve(s) (994) may be a manually actuated valve, electronically actuated valve, or use alternative or additional. Spray rail assembly clamp (991) may be, for example, a tri-clover type of clamp assembly, or it may be any other type of clamping connector as would occur to one knowledgeable in the art.

It should be understood that any one or more of the teachings, expressions, embodiments, examples, etc. described herein may be combined with any one or more of the other teachings, expressions, embodiments, examples, etc. that are described herein. The described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of this disclosure and the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A wastewater processing apparatus, comprising:
   a chamber having an upper portion, a lower portion, and an outer wall;
   a wastewater introduction port in the upper portion of the chamber, wherein the wastewater introduction port is configured to introduce wastewater, wherein the lower portion of the chamber is configured to accumulate an un-vaporized portion of the wastewater, and wherein the accumulated un-vaporized portion of the wastewater defines a surface plane;
   a burner configured to output hot air; and
   a burner tube coupled with the burner and extending through at least part of the upper portion of the chamber to the lower portion of the chamber, wherein the burner tube comprises a burner tube wall that defines an interior region, and the burner tube has an exterior surface situated within the chamber;
   wherein the burner tube is suspended from the upper portion of the chamber into the lower portion of the chamber and is configured to deliver the hot air in a direction substantially orthogonal to the surface plane.

2. The wastewater processing apparatus of claim 1, wherein the hot air is operable to vaporize at least a portion of the introduced wastewater in the upper portion and at least a portion of the accumulated un-vaporized portion of the wastewater.

3. The wastewater processing apparatus of claim 1, wherein the upper portion is separated from the lower portion by a substrate through which the hot air can flow, the upper portion further comprising:
a plurality of pall rings positioned above the substrate.

4. The wastewater processing apparatus of claim 3, wherein the pall rings are made of metal and define a substantially cylindrical shape.

5. The wastewater processing apparatus of claim 1, wherein the burner tube delivers the hot air to the surface plane through the interior region of the burner tube, and the burner tube wall is configured to conduct heat from the interior region to the exterior surface.

6. The wastewater processing apparatus of claim 1, wherein the wastewater introduction port is configured to spray the wastewater into the upper portion of the chamber.

7. The wastewater processing apparatus of claim 1, wherein the burner tube is configured to deliver the hot air at substantially atmospheric pressure.

8. The wastewater processing apparatus of claim 1, the chamber further comprising:
a plurality of access doors positioned on the exterior surface of the chamber, wherein each of the plurality of access doors provides selective access into the upper portion of the chamber.

9. The wastewater processing apparatus of claim 1, wherein the chamber includes a drain port, the apparatus further comprising:
a wastewater level sensor configured to detect a level of wastewater in the lower portion of the chamber;
a wastewater collection tank;
a first fluid connection from the wastewater collection tank to the wastewater introduction port, the first fluid connection being controlled by a first pump;
a second fluid connection from the drain port to the wastewater collection tank, the second fluid connection being controlled by a second pump; and
a controller configured to selectively control the first pump and the second pump to recirculate wastewater between the wastewater collection tank and the chamber at least in part as a function of the level of wastewater detected by the wastewater level sensor.

10. The wastewater processing apparatus of claim 1, wherein the chamber includes:
a drain port; and
a fluid pipe positioned within the chamber and fluidly coupled with the drain port, wherein the fluid pipe includes a preformed bend.

11. The wastewater processing apparatus of claim 10, wherein the fluid pipe is movable between a first rotational position and a second rotational position.

12. The wastewater processing apparatus of claim 11, wherein the fluid pipe includes an adjustment feature, further comprising:
an adjustment rod shaped to mate with the adjustment feature, wherein the adjustment rod is selectively operable to rotate the fluid pipe between the first rotational position and the second rotational position.

13. The wastewater processing apparatus of claim 1, wherein:
the burner tube defines a first radius of curvature; and
the wastewater introduction port includes a plurality of elongated spray bars extending into the chamber, wherein:
each of the plurality of elongated spray bars includes a straight portion and a curved portion,
the curved portion defines a second radius of curvature substantially equal to the first radius of curvature, and the curved portions are each configured to extend partially circumferentially around the burner tube wall.

14. The wastewater processing apparatus of claim 1, further comprising a baffle positioned within the lower portion of the chamber.

15. A wastewater processing apparatus, comprising:
an outer cylinder having an upper portion and a lower portion, wherein the outer cylinder defines a first length;
an inner cylinder suspended from the upper portion of the outer cylinder and extending from the upper portion of the outer cylinder toward the lower portion of the outer cylinder, wherein the inner cylinder defines a second length that is less than the first length;
a wastewater introduction port in the upper portion of the outer cylinder, wherein the wastewater introduction port is configured to introduce wastewater such that the wastewater falls from the upper portion toward the lower portion, and wherein at least a first portion of the wastewater accumulates in the lower portion of the outer cylinder; and
a blower configured to transfer hot air through the inner cylinder and into the lower portion of the outer cylinder.

16. The wastewater processing apparatus of claim 15, wherein the hot air is transferred into the lower portion of the outer cylinder at substantially atmospheric pressure.

17. The wastewater processing apparatus of claim 15, wherein the hot air is delivered toward the accumulated wastewater in a direction substantially the same as the direction of the falling wastewater.

18. The wastewater processing apparatus of claim 15, wherein the lower portion of the outer cylinder includes:
a drain port; and
a fluid pipe positioned within the lower portion of the outer cylinder and fluidly coupled with the drain port, wherein the fluid pipe includes a preformed bend.

19. The wastewater processing apparatus of claim 15, wherein:
the inner cylinder defines a first radius of curvature;
the wastewater introduction port includes a plurality of elongated spray bars extending into the outer cylinder;
each of the plurality of elongated spray bars includes a straight portion and a curved portion, wherein the curved portion defines a second radius of curvature substantially equal to the first radius of curvature; and
the curved portions of the elongated spray bars are each configured to extend partially circumferentially around the inner cylinder.

20. A wastewater processing apparatus, comprising:
an outer cylinder having an upper portion, a lower portion, and an outer wall;
a wastewater introduction port in the upper portion of the outer cylinder, wherein the wastewater introduction port is configured to introduce wastewater, and the lower portion of the outer cylinder is configured to accumulate an un-vaporized portion of the wastewater; and
an inner cylinder disposed within the outer cylinder and extending through at least part of the upper portion of the outer cylinder to the lower portion of the outer cylinder, wherein the inner cylinder is configured to emit hot air into the lower portion of the outer cylinder at substantially atmospheric pressure;
wherein the inner cylinder defines an exterior cylinder wall surface, wherein the exterior cylinder wall surface is configured such that it is secured to and suspended from the upper portion of the outer cylinder.

* * * * *